(12) United States Patent
Duschl et al.

(10) Patent No.: US 9,860,782 B2
(45) Date of Patent: Jan. 2, 2018

(54) ROUTING OF SIGNALS IN A MESH NETWORK TO REDUCE BURDEN ON INTERMEDIARY NODES

(71) Applicant: International Business Machines Corporation, Armonk, NY (US)

(72) Inventors: Heather L Duschl, Raleigh, NC (US); Ashutosh Kumar, Apex, NC (US); Alexandra D. Markello, Fayetteville, NC (US); Dana L. Price, Surf City, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 14/933,538

(22) Filed: Nov. 5, 2015

(65) Prior Publication Data
US 2017/0134981 A1 May 11, 2017

(51) Int. Cl.
| | |
|---|---|
| *H04L 12/26* | (2006.01) |
| *H04L 1/00* | (2006.01) |
| *H04W 28/02* | (2009.01) |
| *H04L 12/707* | (2013.01) |
| *H04W 72/04* | (2009.01) |
| *H04W 84/18* | (2009.01) |

(52) U.S. Cl.
CPC ......... *H04W 28/0221* (2013.01); *H04L 45/22* (2013.01); *H04W 72/048* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 9,025,461 | B2 | 5/2015 | Krishnamurthy et al. |
| 2012/0326927 | A1 | 12/2012 | Nikkels |

(Continued)

OTHER PUBLICATIONS

Lanzisera, S. et al.; "Reducing average power in wireless sensor networks through data rate adaptation"; ICC 2009—2009 IEEE International Conference on Communications, 6 pp., IEEE; 2009.

(Continued)

*Primary Examiner* — Edan Orgad
*Assistant Examiner* — Rebecca Song
(74) *Attorney, Agent, or Firm* — Cantor Colburn LLP; Scott Dobson

(57) ABSTRACT

Aspects include a method, system and computer product for routing a signal in a mesh network. The method includes identifying a first intermediate node and a second intermediate node disposed between a first node and an access point, the first node being coupled for communication to both the first intermediate node and the second intermediate node. A first set of parameters is determined associated with the first intermediate node. A second set of parameters is determined associated with the second intermediate node. A route is determined for transmitting a signal from the first node to the access point using at least one of the first intermediate node and the second intermediate node, the route being chosen based at least in part on the first set of parameters and the second set of parameters. The signal is transmitted on the route from the first node to the access point.

20 Claims, 7 Drawing Sheets

(56) References Cited

U.S. PATENT DOCUMENTS

2015/0138991 A1\* 5/2015 Timariu ............ H04W 52/0229
370/241
2015/0204691 A1 7/2015 Salter
2016/0269486 A1\* 9/2016 Gupta .................... H04L 67/12

OTHER PUBLICATIONS

Arezoomand, AS. et al.; "Prolonging Network Operation Lifetime with New Maximum Battery Capacity Routing in Wireless Mesh Network"; 2nd International Conference on Computer and Automation Engineering, (ICCAE 2010), pp. 319-323; IEEE, 2010.

Internel Society RFCS et al.; "Design and Application Spaces for IPv6 over Low-Power Wireless Personal Area Networks (6LoWPANs)"; An IP.com Prior Art Database Technical Disclosure; http://ip.com/IPCOM/000217078; May 1, 2012.

Internet Society RFCS et al.; "Problem Statement and Requirements for IPv6 Low-Power Wireless Personal Area Networkl (6LoWPAN)"; An IP.com Prior Art Database Technical Disclosure; http://ip.com/IPCOM/000218244; May 30, 2012.

\* cited by examiner

ROUTING OF SIGNALS IN A MESH NETWORK TO REDUCE BURDEN ON INTERMEDIARY NODES

BACKGROUND

The present invention relates generally to a mesh communications network and, more specifically, to a method and system of routing signals on the network.

Wireless signals, such as cellular signals, are typically transmitted from a node (e.g. a cell phone) to an access point (e.g. a cellular tower). The access point transfers or relays the signal from the node into the network. The ability to transfer signals from the node to the nearest access point will depend on their locations and potentially the surrounding environment. In wireless systems that use line-of-sight communications for example, obstacles such as hills, thick stands of trees or hardened walls (e.g. concrete) may interfere with or reduce the reliability of the transmission.

One type of wireless network, referred to as a mesh network, uses intermediary devices or local nodes to assist in the transmission of signals between remote nodes that are out of range or otherwise have a poor connection with the access point. The local nodes perform as an access point for the remote nodes and allow them to access the network. In some systems, the signals from the remote nodes may pass through a plurality of intermediary nodes before reaching the access point.

SUMMARY

Embodiments include a method, system, and computer program product for routing a signal in a mesh network. A method includes identifying a first intermediate node and a second intermediate node disposed between a first node and an access point, the first node being coupled for communication to both the first intermediate node and the second intermediate node. A first set of parameters is determined associated with the first intermediate node. A second set of parameters is determined associated with the second intermediate node. A route is determined for transmitting a signal from the first node to the access point using at least one of the first intermediate node and the second intermediate node, the route being chosen based at least in part on the first set of parameters and the second set of parameters. The signal is transmitted on the route from the first node to the access point.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to a mesh communications network that includes improved signal routing management based on parameters, criteria or policies that allow for distribution of signal routing through the intermediary nodes. Embodiments of the present disclosure provide for improved signal routing management of routing based on user-defined parameters. Embodiments of the present disclosure provide for further improved routing management to allow a user on the network to control the amount of power consumed by routing signals on the mesh network.

Figure 1:
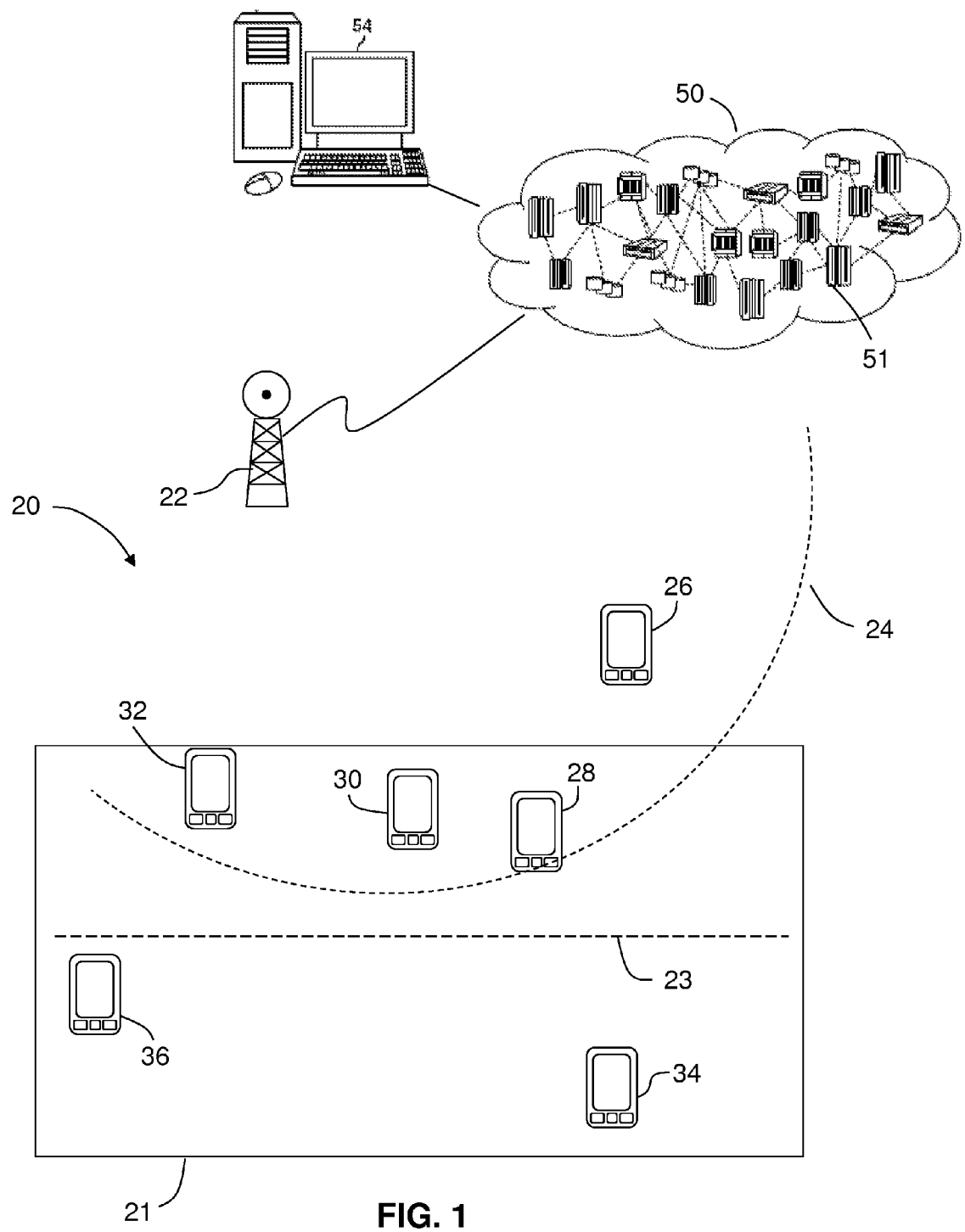
FIG. 1 depicts a schematic diagram of a mesh network in accordance with some embodiments of this disclosure.

Turning now to FIG. 1, a mesh network 20 is generally shown in accordance with an embodiment. A mesh network is a communications network made up of nodes organized in a mesh topology. It is also a form of wireless ad hoc network. Wireless mesh networks often consist of mesh clients, mesh routers and access-points/gateways. The mesh nodes are often devices such as but not limited to laptops, cell phones and other wireless devices while the mesh routers forward traffic to and from the access points which may, but need not, connect to other networks. The coverage area of the nodes working as a single network is sometimes called a mesh cloud. Access to this mesh cloud may depend on the nodes working with each other to create a radio network. A mesh network is reliable and offers redundancy. When one node can no longer operate, the rest of the nodes can still communicate with each other, directly or through one or more intermediary nodes. Wireless mesh networks can be configured to self-form and self-heal.

The mesh network 20 includes an access point 22, such as cellular tower for example. The access point 2 has a range 24 where signals to and from nodes 26, 28, 30, 32 on the network can be transmitted and received. As will be discussed in more detail below, the mesh network 20 may include additional remote nodes 34, 36 that are outside of the range 24 of the access point 22. These remote nodes 34, 36 may not be able to communicate directly with the access point 22 due to obstructions, such as geographic obstructions (e.g. a hill) or man-made obstructions (e.g. buildings 21, concrete walls 23). To send and receive signals from the mesh network 20, the remote nodes 34, 36 transmit signals through one or more intermediate nodes 26, 28, 30, 32 which relay the signals to and from the access point 22.

It should be appreciated that while the mesh network 20 may be described herein as a cellular network, this is for exemplary purposes and the claims should not be so limited. In some embodiments, the mesh network 20 may be a managed IP network administered by a service provider. The mesh network 20 may be implemented in a wireless fashion, e.g., using wireless protocols and technologies, such as WiFi, WiMax, AM radio, FM radio, television, Bluetooth, two-way radio, and satellite signals such as GPS and television. The mesh network 20 may also be a packet-switched network such as a local area network, wide area network, metropolitan area network, the Internet, or other similar type of network environment. The mesh network 20 may be a fixed wireless network, a wireless local area network (LAN), a wireless wide area network (WAN) a personal area network (PAN), a virtual private network (VPN), intranet or other suitable network system and may include equipment for receiving and transmitting signals. Further, while embodiments herein may refer to cellular phone devices, the devices may also be, but are not limited to: tablet computers, laptop computers, repeaters, routers, personal digital assistants (PDA), scanners, network connected appliances or other devices that include computing circuitry that are configured to wirelessly communicate with one or more other devices (e.g. electrical and water meters, smoke detectors, security cameras, thermostats, HVAC controls, lighting devices, and the like).

The access point 22 is coupled to a network 50 and is configured to transmit signals between the mesh network 20 and the nodes 26, 28, 30, 32. In one embodiment, the network 50 may be any known network including, but not limited to, a wide area network (WAN), a public switched telephone network (PSTN), a local area network (LAN), a global network (e.g. Internet), a virtual private network (VPN), and an intranet. The network 50 may be implemented using a wireless network or any kind of physical network implementation known in the art. As will be discussed in more detail below, a computing device 54, such as a computer for example, is connected to the network 50 and provides centralized monitoring and management control functionality for the mesh network 20. In one embodiment, the computing device 54 is coupled to the access point 22 rather than the network 50. In one embodiment, the mesh network 20 may be decentralized with each node performing a routing function with its peers.

It is understood in advance that although this disclosure includes a detailed description of a network 50 that includes distributed or cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, the network 50 may be illustrative of a cloud computing environment. As shown, cloud computing environment 50 comprises one or more cloud computing nodes 51 with which local computing devices used by cloud consumers, such as, for example, mesh network 20 and the nodes within mesh network 20 may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices shown in FIG. 1 are intended to be illustrative only and that computing nodes and cloud computing environment 50 can communicate with any type of computerized device over any type of network and/or network addressable connection (e.g., using a web browser).

Figure 2:
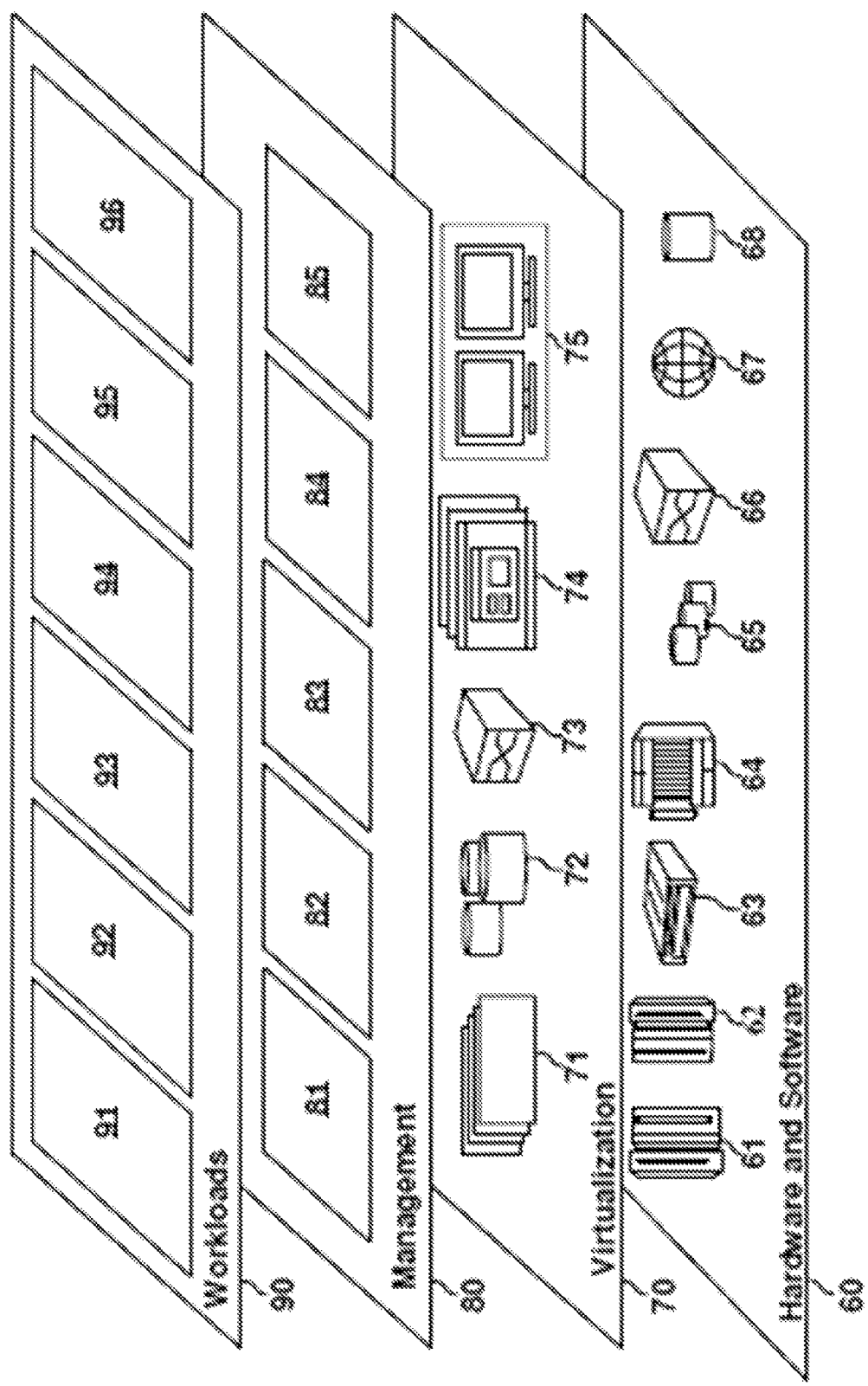
FIG. 2 depicts abstraction model layers according to an embodiment of this disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in one embodiment, a mesh network routing.

Figure 3:
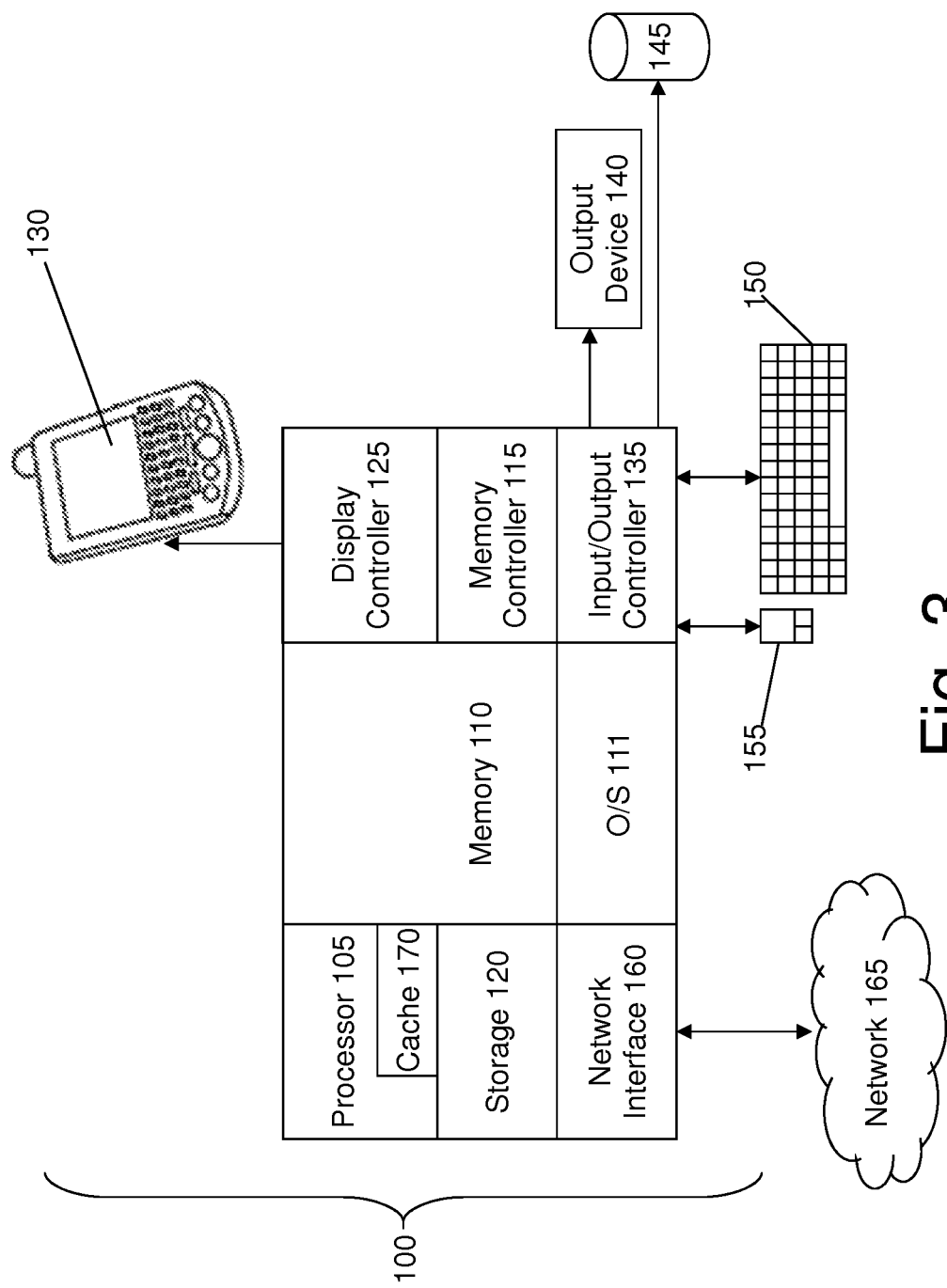
FIG. 3 depicts a block diagram of a node for implementing some or all aspects of the system, according to some embodiments of this disclosure.

Turning now to FIG. 3, a block diagram of a node is shown for use with the mesh network 20 according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system, such as a personal computer, workstation, minicomputer, or mainframe computer. It should be appreciated that while embodiments herein may refer to the nodes 26, 28, 30, 32, 34, 36 as a particular type of device, such as a cellular phone for example, this is for exemplary purposes and the claims should not be so limited. In some embodiments, the nodes may homogenous (e.g. all cellular phones) or non-homogenous (e.g. a mixture of devices, such as cellular phones, laptop computers and tablet computers).

In some embodiments, as shown in FIG. 3, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. Input devices such as a keyboard 150 and a pointing device 155 (e.g. a mouse or touchscreen) may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the node 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 3, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The node 100 may further include a display controller 125 coupled to a display 130. In some embodiments, the node 100 may further include a network interface 160 for connecting to and communicating with the mesh network 20.

Systems and methods according to this disclosure may be embodied, in whole or in part, in computer program products or in nodes 100, such as that illustrated in FIG. 3.

Figure 4:
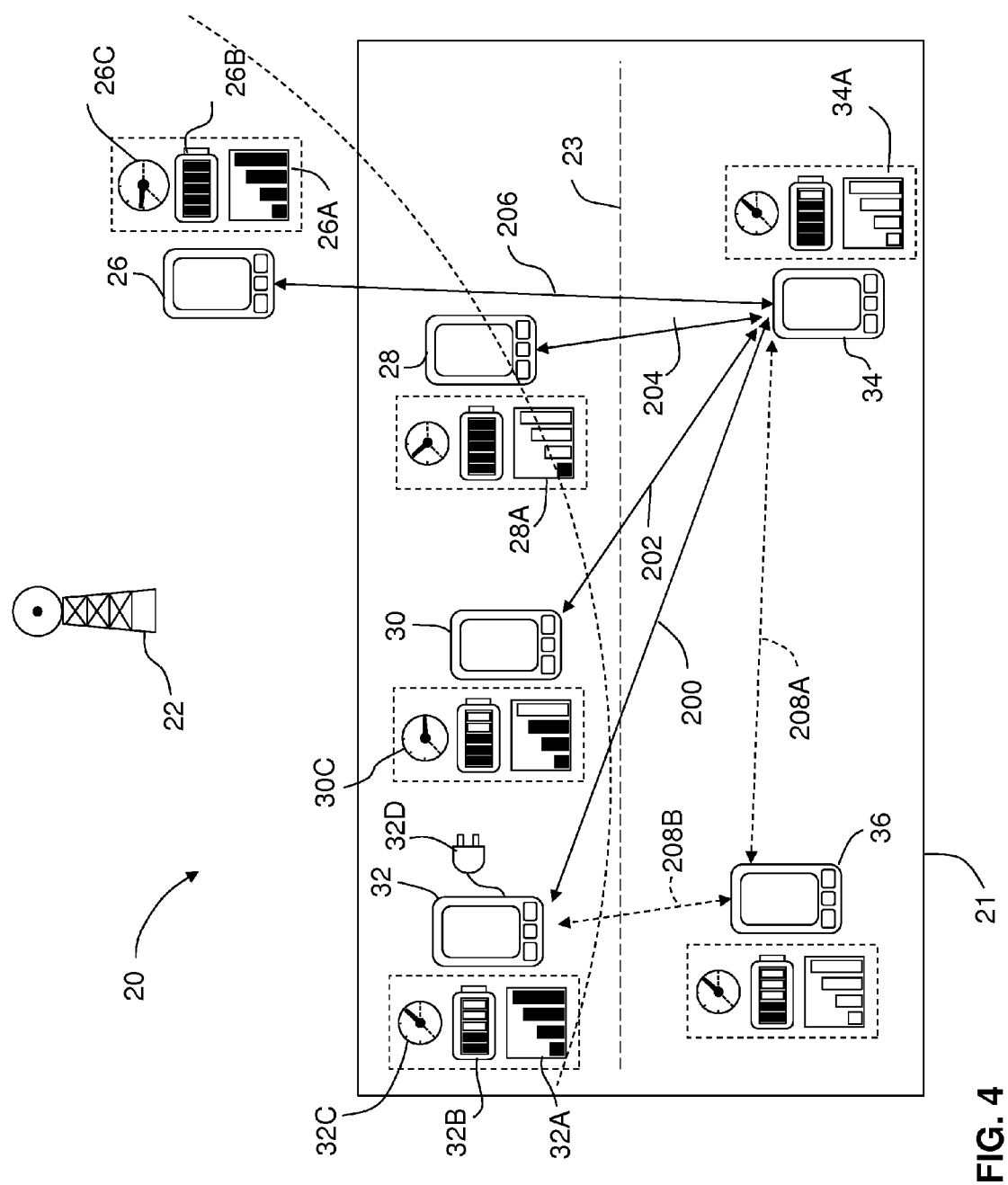
FIG. 4 and FIG. 5 depict schematic diagrams of a mesh network signal routing in accordance with an embodiment of this disclosure.

Referring now to FIG. 4 a system is shown and a method described for managing the routing of signals through the mesh network 20. Since the remote nodes, such as node 34 for example, are unable to connect directly with the access point 22, a signal transmission route is determined between the transmitting node and the access point 22. Using node 34 as an example, it should be appreciated that there may be a plurality of routes 200, 202, 204, 206 for the transmission of the signal to and from nodes 26, 28, 30, 32 that may directly communicate with access point 22. Further, other routes 208A, 208B may be available where the signal is transmitted through multiple intermediary nodes 36, 32 (multiple-hop route) before being transmitted to the access point. It should be appreciated that in order for a particular route to be viable, not all of the intermediary nodes need to be able to directly transmit signals to the access point 22, provided that at least one of the intermediary nodes has sufficient signal strength to transmit and receive signals from the access point 22.

Typically, mesh networks routed the signals through an intermediary device that was either closest to the transmitting node, or the node that had the highest battery charge level. A high battery charge level was desired in an intermediary node since performing as an intermediary node results in an increase in the electrical power used by the node. It should be appreciated that a user of the node being used as an intermediary would experience more battery drain and would have to charge their battery more frequently. Further, networks that focus on a single factor, such as battery level, end up passing more signals from multiple devices through the node having the highest battery level. Thus users may lack incentives to join the mesh network as they may not have sufficient battery level left in their device after their participation.

To alleviate this, the mesh network 20 determines the route based on a plurality of parameters, including user-defined parameters and administrator or network-defined parameters. User defined parameters may include, but are not limited to: a desired minimum battery charge/power level at the end of a predetermined time period (e.g. 10% left prior to commute home, 30% prior to a plane flight); allowable activity transmission types (e.g. email data signals allowed, game data signals are not allowed); time periods when the node will function as an intermediary node; and allowable user connections (e.g. particular users of the mesh network for whom signals will be transferred, co-workers yes, guests no) for example. The user-defined parameters allow the node user to determine how and when their device may be used as part of a mesh network. Thus, users are encouraged to join the mesh network since they can at least partially control how their device is going to be used and feel comfortable that they will still be able to use their device when needed.

The network-defined parameters are a set of parameters that are applied to all nodes within the mesh network 20. The network-defined parameters are those that allow the mesh-network operator or administrator to control the performance or reliability of the mesh network. Network-defined parameters include, but are not limited to: rate of depletion of battery power; initial level of battery power; recharge potential for a node; minimum signal strength; device type; activity type; priority level of the node user; limits for the number of transmitting nodes to be routed through a single intermediary node; minimum network speed; minimum bandwidth. In an embodiment, the network-defined parameters may be weighted so that some parameters (e.g. rate of battery depletion, signal strength) may have more of an impact on the determination of the route.

In an embodiment, the rate of depletion parameter defines a threshold level of the user's usage so that if the user is consuming power at a high rate (e.g. 5% of total power per quarter hour or 5% of remaining power per quarter hour), then the mesh network 20 may exclude that device as an intermediary node to avoid placing additional power consumption burdens on the node. The initial level of battery power parameter defines a threshold level (e.g. 50% charge or 75% charge) of a node before it will be used as an intermediary node. The recharge potential parameter is directed to an expected time period before the node's battery will be plugged in for charging. The recharge potential parameter may be determined by the known work-day characteristics for the user or their calendar for example. The device type parameter is directed to the type of device and its level of power consumption. For example, a cellular phone that is capable of executing complex software applications (sometimes colloquially referred to as a "smartphone") will user electrical power at a higher rate than a less sophisticated cellular phone (e.g. a "flip-phone").

The signal strength parameter is a threshold for determining when a node can operate as an intermediary node with the desired level of reliability. For example, signal strength may be measured in terms of "bars". The term "bars" refers to the number of lines or circles shown on the node's user interface. Typically, four or five bars means a strong signal strength, while one bar indicates marginal signal strength. It should be appreciated that when an intermediary node's signal strength is too low, there is a potential that a signal received from another node in the mesh network 20 will not be transmitted back to the access point.

Each of the nodes 26, 28, 30, 32, 34, 36 has an associated set of current operating levels, such as signal strength, battery level, rate of battery discharge, and charging state. For example, node 26 has a signal strength 26A of four bars, a full battery charge 26B, a rate of battery discharge 26C, and a charging state of none (e.g. not plugged into a charger). While the node 32 includes a signal strength 32A of four bars, a 50% battery charge 32B, a high rate of battery discharge 32C and a charge state 32D of charging. In an embodiment, these operating levels are transmitted on a periodic or aperiodic basis to either the adjacent nodes (e.g. node 30 transmits to nodes 28, 32, 34, 36) or to a computing device such as computing device 54 for example. In another embodiment, these operating levels are transmitted in response to receiving a signal, such as from an adjacent node or from computing device 54.

In operation, the mesh network 20 determines a route for transmitting a signal from a remote node to the access point 22. As discussed above, there may be a plurality of routes that the signal may be transmitted on. Using node 34 as an example, node 34 has a signal strength 34A of no signal, meaning the only way for the user of node 34 to communicate is through the mesh network 20. The mesh network 20 then evaluates each of the potential routes 200, 202, 204, 206, 208A-208B by applying the respective operating levels for each node 26, 28, 30, 32, 36 to both the system-defined parameters and the respective user-defined parameters. The mesh network 20 may then be able to eliminate some routes, such as route 204 for example, because the intermediate node 28 has a signal strength 28A that is below the defined signal strength parameter threshold (e.g. below two bars) for example. Other nodes, such as node 30 may be eliminated based on other parameters, such as the rate of discharge 30C being above the rate of depletion parameter threshold. By removing the node 30 from the transmission route, the user of node 30 will avoid having their battery drained such that it may not have sufficient charge when the user needs to use it. As a further example, the user may have established a user-defined parameter that they need at least 30% charge for their commute home at 5 PM, as a result the mesh network 20 may eliminate node 30 as an intermediate node to ensure the user-defined parameter is achieved.

By removing the intermediate nodes that do not meet the desired system-defined and user-defined parameters, the mesh network 20 may then determine which of the remaining routes would allow the transmission of signals while balancing the impact of the routing of signals on the intermediary nodes. In one embodiment, this determination includes avoiding unduly burdening any given intermediate node by supporting multiple remote nodes. In the example above, routes 206, 200, 208A-208B remain as viable routes for transmission of the signal. The determination of which route to use may made by balancing a number of system-defined and user-defined parameters. Route 206 seems to meet the desired criteria since node 26 has a strong signal level 26A, a full battery level 26B and a low rate of discharge 26C. Route 200 would seem to be less desirable than route 206 since the node 32 has a lower battery charge level 32B and a high rate of discharge 32C. However, node 32 is being charged so depending on the user-defined parameters of node 32, the route 200 may be a more desirable route as overall the transmitting of signals via node 32 will have a smaller impact on the node 32 than the other available intermediary nodes. For example, if the user-defined minimum battery level parameter is 10%, the mesh network 20 may chose node 32 as the intermediate node rather than node 26 to avoid increasing the discharge rate of the battery in node 26. Finally, route 208A-208B may also be evaluated as a viable path. While there are some disadvantages to route 208A-208B due to the need for two intermediate nodes 36, 32, there are also some favorable factors for this route. For example, the node 36 is closer to the transmitting node 34. As a result, the total amount of electrical power used for transmitting signals may be less than for route 200 or 206 where the nodes 26, 32 are located farther away from the transmitting node. It should be appreciated that while embodiments herein refer to a single "signal" the data or information transmitted may be transmitted through a single signal transmission, or through multiple signal transmissions. In one embodiment, the mesh network 20 is a packet based system wherein the data or information is split into multiple signal transmissions as packets. In some embodiments, the routing of the packet signals is split between two or more routes. The process of routing of the packet signals may include packet level distinction wherein the route of the packet signal is based on the type of data (e.g. text message vs. game) being transmitted.

In one embodiment, the mesh network 20 determines a rating X for each of the potential routes and determines which route will be used based on the value of the rating. In an embodiment, the mesh network 20 may define a threshold for the rating X, where if none of the routes meet the threshold, the transmitting node is blocked from the mesh network until the threshold is met. In still another embodiment, the system-defined or the user-defined parameters may be weighted so that the rating X may be determined by Equation 1:

$$X = \Sigma_1^i W_i P_i \qquad (1)$$

Where X is the route rating, Wi is the weighting for parameter "i" and Pi is system-defined or user-defined parameter "i". In this embodiment, certain parameters have more influence on rating than others. It should be appreciated that the mesh network 20 may be an ad hoc network and the determination of which route to transmit signals may change on a periodic, aperiodic or continuous basis as nodes enter, leave or move within the area covered by mesh network 20. Thus the route rating X may change over the course of short periods of time.

In an embodiment, the determination of which route to transmit a signal may be determined by and distributed between the intermediate nodes. For example, each of the intermediate nodes 26, 28, 30, 32 may determine the X rating for the route that passes through that intermediate node. The intermediate node may determine that it is not adequate as one or more system-defined or user-defined parameter thresholds are not satisfied (e.g. signal strength too low). When an intermediate node determines it is not adequate, the intermediate node transmits a signal to the transmitting node (or an adjacent node in a multi-hop embodiment) and the transmitting node removes that intermediate node as a possible route. The remaining intermediate nodes determine their respective X rating and transmit that information to the transmitting node. The transmitting node then selects the route having the X rating that satisfies selection criteria (e.g. the rating having the lowest impact on the intermediate nodes).

In another embodiment, the determination of which route to transmit a signal will be performed by a computing device 54 connected to the mesh network 20. In the exemplary embodiment, the computing device 54 is connected to the mesh network 20 via network 50. In other embodiments, the computing device may be coupled to the access point 22 or connected via a wired or wireless connection to the mesh network 20. In this embodiment, the computing device 54 maintains a list, table or schedule of nodes that are located within the network. For each of the remote nodes (e.g. nodes that cannot directly communicate with the access point 22) the computing device 54 determines possible routes for transmission of signals and determines which route will be used by each remote node. This table, including the determined route, is then transmitted to all of the nodes within the mesh network. This list or table may be updated on a periodic, aperiodic or continuous basis by the computing device 54. The updated list or table may be transmitted to the nodes within the mesh network 20 on a periodic, aperiodic or continuous basis.

Figure 5:
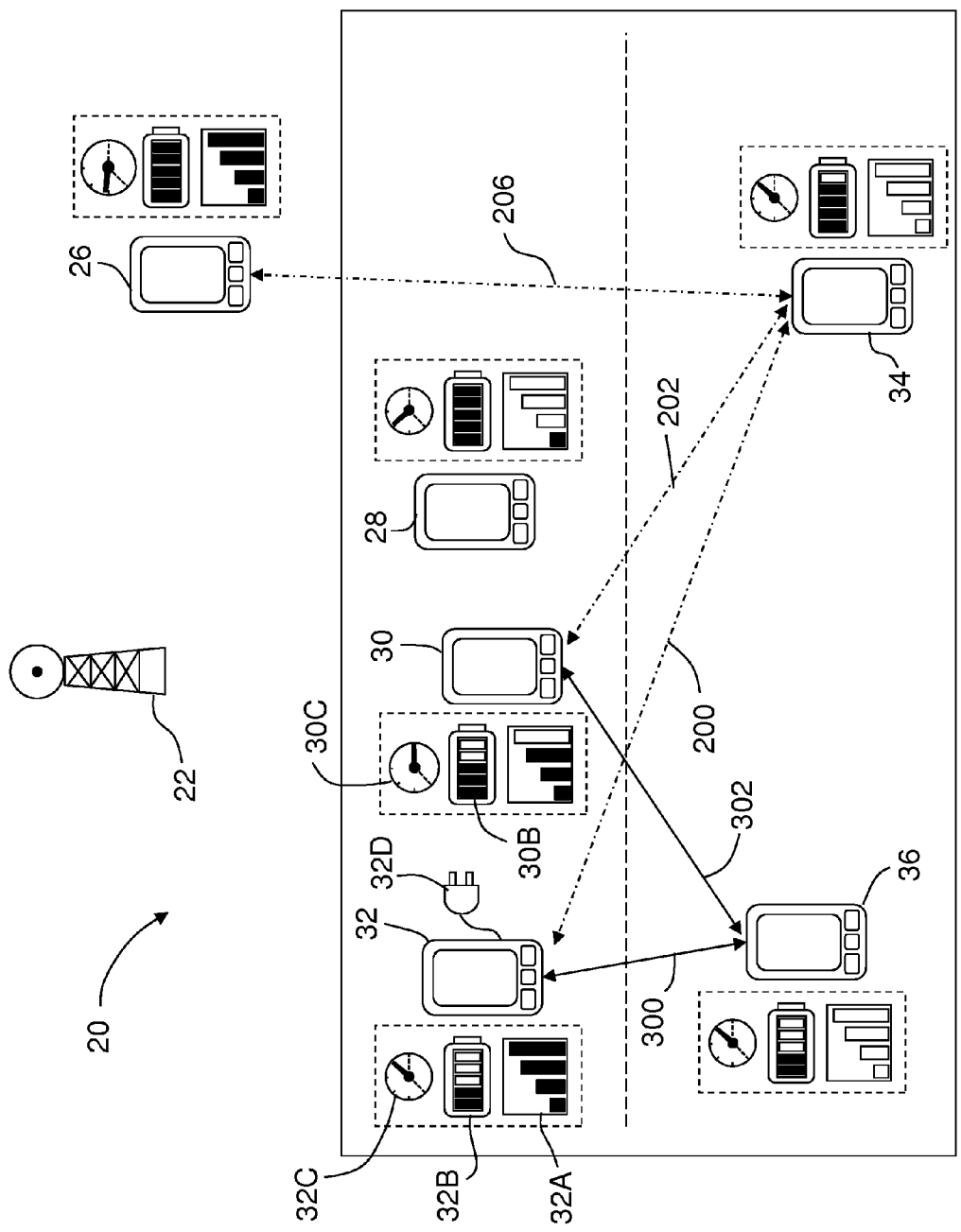

It should be appreciated that some of the embodiments provide advantages in avoiding unduly burdening one or a small number of intermediate nodes with supporting the transmission of signals from a large number of remote nodes. Referring to FIG. 5, an embodiment is illustrated wherein two remote nodes 34, 36 need to establish a route for transmitting signals to and from the access point 22. When node 28 is removed due to poor signal quality and node 26 is removed due to distance between the devices, two remaining intermediate nodes 30, 32 remain. In this example, it would appear that node 32 would be selected as the intermediate node due to its strong signal strength level 32A, charge state 32D and lower rate of discharge 32C when compared with node 30. However, if mesh network 20 routes signals from both remote nodes 34, 36 through intermediate node 32, this may unduly burden node 32 since the performance as an intermediate node both increases the battery usage of the device and increases the computational load (i.e. may lower performance of the device for the user). In this example, the mesh network 20 would evaluate alternate routes for each of the remote nodes 34, 36 while keeping them from having a route that passes through the same intermediate node. This determination may, for example, include an evaluation of the type of signals being transmitted by the remote nodes 34, 36. If node 36 is transmitting simple text messages while the node 34 connecting to web-based internet services, the respective loads placed on the intermediate nodes 30, 32 may be very different since bandwidth requirements for a text message are much lower than for transferring text and images from a web-based internet service.

In this embodiment, the mesh network 20 may change the route for one or more of the remote nodes to avoid having the same intermediate node support both remote nodes. In the example given above, even though the node 30 has a lower battery level 30B and a high rate of discharge 30C, to balance out the distribution of loads the mesh network 20 may determine that the remote node 36 will route signals through intermediate node 30 due to the type of signal (e.g. text message) being transmitted by remote node 36 while transmitting the signal from remote node 34 through intermediate node 32. This determination may be further based on the user-defined parameters of node 30, such as the amount of battery charge the user of node 30 desires at a particular point in time (e.g. the end of the day). Thus, a particular potential intermediate node may be suitable to route some remote nodes and not others based on the type of signal or type and amount of data the remote node is transmitting. It should be appreciated that the mesh network 20 may also change the route for the signals of node 34 to a less desirable route, such as route 206, which results in a longer transmission distance and therefore additional power requirements on the devices for example, to accommodate the transmission of signals from node 36.

In one embodiment, the determination of the route may further include determining the device type of the intermediate node. In the example where the nodes are cellular devices, some cellular devices may have higher usage of their battery due to the components, such as display type or size for example. Some device types, such as cellular phones having operating systems that execute complex applications that include high-definition color screens (e.g. "a smart-phone") for example, need a larger amount of stored charge for a given period of time than other device types, such as a cellular phone (e.g. a "flip phone") having a small monochrome screen and a hardware dialing interface and use less power and generally have a longer battery life. For example, if the node 26 is a flip-phone, the mesh network 20 may determine to route signals along route 206 from node 34 since intermediate node 26 uses less battery charge during its normal operations.

Figure 6:
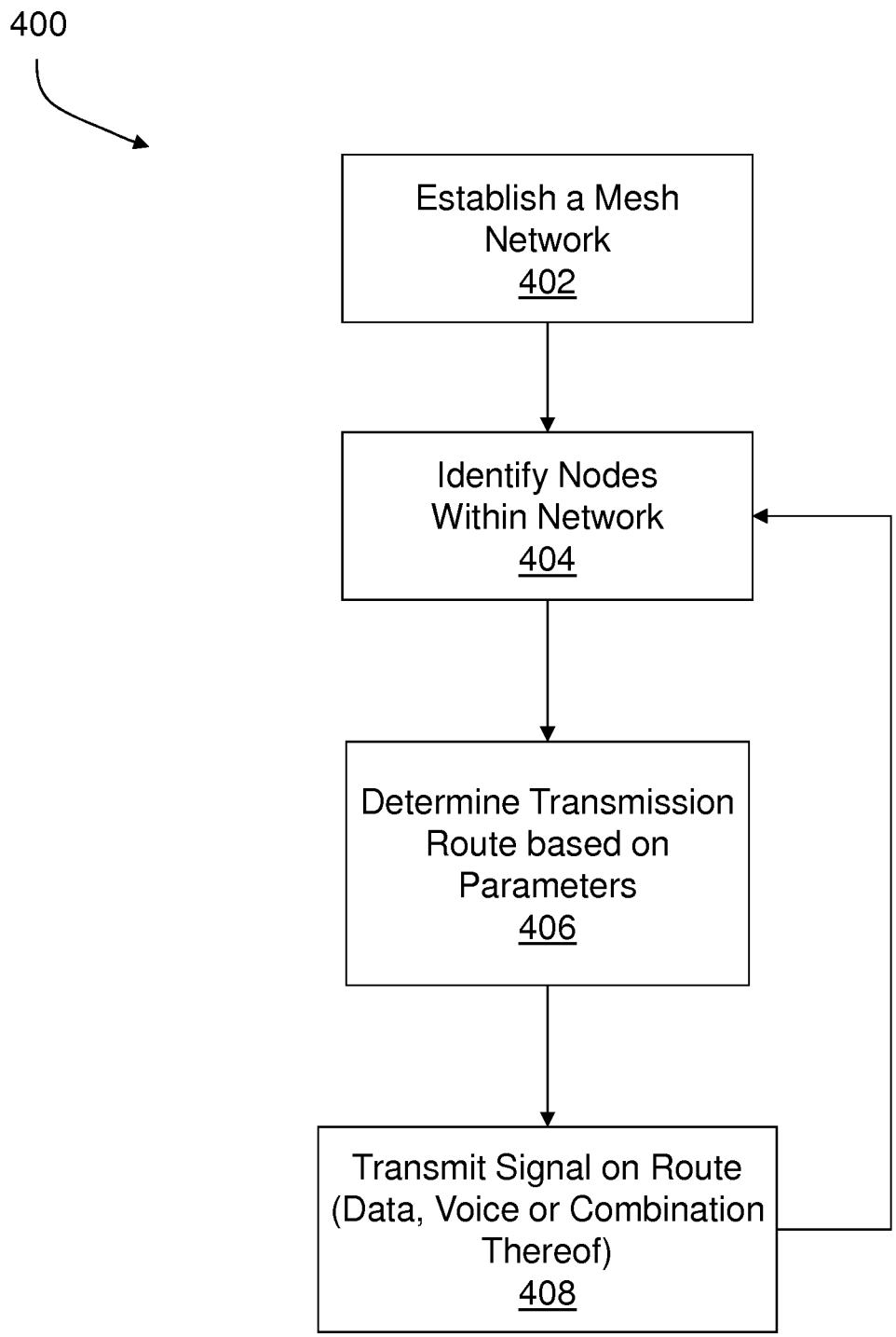
FIG. 6 depicts a flow diagram for implementing signal routing in a mesh network in accordance with an embodiment of this disclosure.

Referring now to FIG. 6, a method 400 is shown for determining a route for signals in a mesh network. The method initiates in block 402 with the establishment of the mesh network with at least one access point and a plurality of nodes, wherein at least one of the nodes is not in direct communication of an acceptable level with the access point. The access point allows for the transmission of signals from the mesh network to one or more external networks. The nodes within the network are identified in block 404. In an embodiment the identification of the nodes may include defining a node table, list or schedule. This node table may be determined by a centralized device, or may be performed by one or more nodes within the mesh network. In another embodiment, the identification of nodes is performed by each node to identify the nodes with which it can transmit signals (e.g. nearby nodes) to define a local node table.

Figure 7:
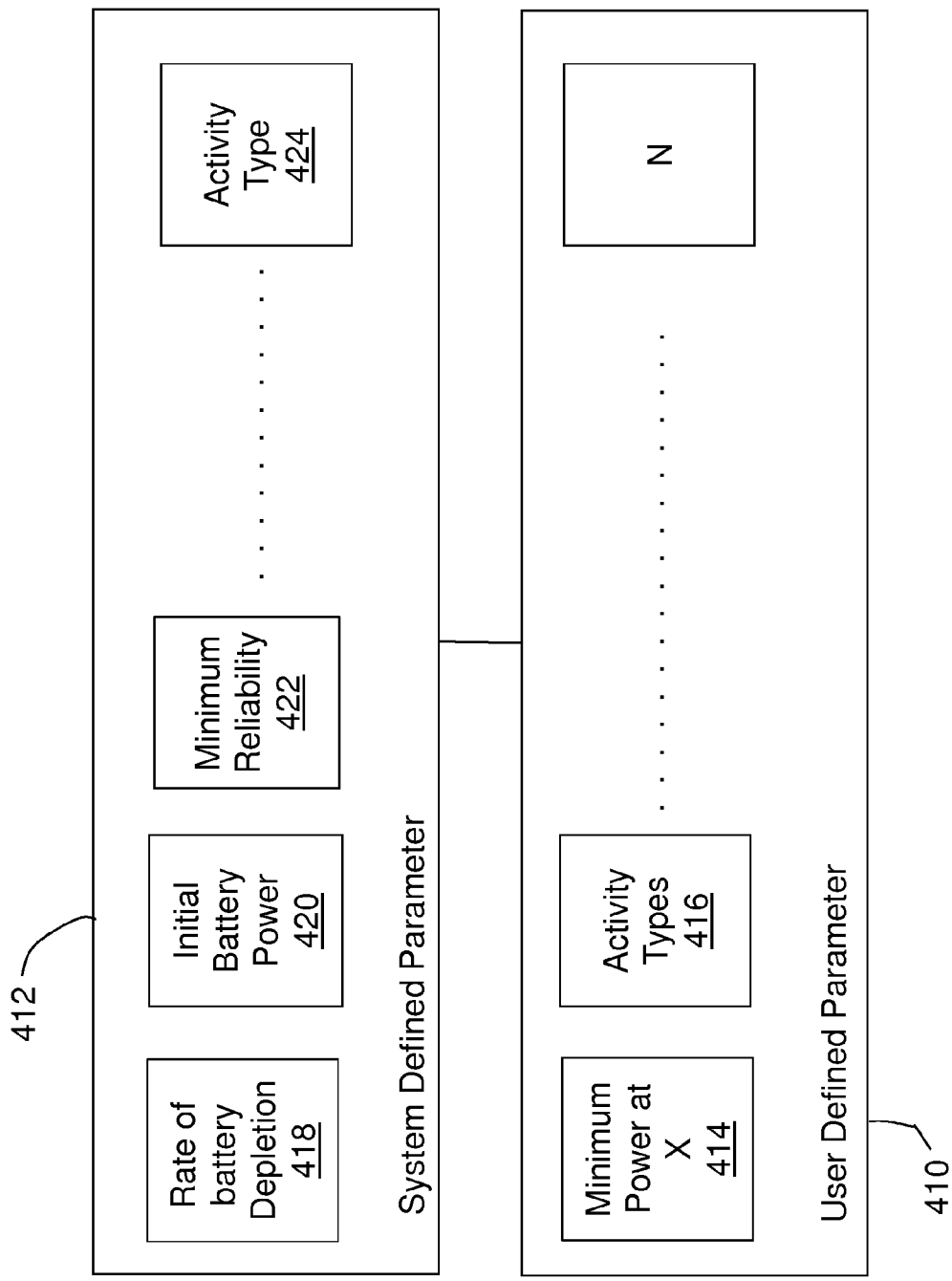
FIG. 7 depicts abstraction layers for parameters or criteria that determine signal routing in a mesh network in accordance with an embodiment of this disclosure.

The method 400 then proceeds to block 406 where a transmission route is determined for each remote node within the mesh network to allow the remote node to transmit signals through the access point. In one embodiment, the determination of the transmission route may be based at least in part on a user-defined parameter for each intermediate node along the transmission route between the remote node and the access point. The user-defined parameter being a parameter selectively configurable by a user of the node to control how and when the node is used as an intermediate node in the mesh network. In one embodiment shown in FIG. 7, the determination of the transmission route includes multiple layers 410, 412 of rules, criteria or parameters. This embodiment may include a set or plurality of user-defined parameters 410 and/or a set or plurality of system-defined parameters 412. It should be appreciated that the method 400 may include additional layers of rules, criteria or parameters that are used to determine the transmission route. In other embodiments, the method 400 may include, but are not limited to: facility-defined parameters, company-defined parameters, governmental-defined parameters, and external-network defined parameters for example.

The user-defined parameter layer 410 may include parameters, criteria or rules that specify how the user or owner of the node will allow or permit their node to be used by the mesh network. Such user-defined parameters may include a minimum power level at a future point in time 414. The user-defined parameters may include an activity based parameter or criteria 416 where the user defined allowable signal types, such as cellular phone signals, text message signals, email signals and internet-protocol (HTTP) signals for example. The activity based parameter may further include prohibited activities, meaning signal types that the node user or owner will not allow passing through their node, such as signals related to gaming for example.

The system-defined parameters 412 may include parameters, criteria or rules that specify how the administrator of the mesh network desires the mesh network to operate with the desired level of performance, reliability and user satisfaction. Such system-defined parameters 412 may include a rate of battery depletion or discharge 418. This parameter or rule allows the determination to include or exclude a particular node from being an intermediate node based on its current rate of battery discharge. This avoids placing additional electrical loads (e.g. relaying signals from remote nodes) on potential intermediate nodes that are already being heavily used by their user. System-defined parameters 412 may further include parameters such as initial battery power level 420 and minimum signal reliability 422. Similar to the rate of battery depletion 418, the initial battery power level 420 avoids substantially depleting a node's battery due to its participation in the mesh network. It should be appreciated that depleting a node's battery could decrease user satisfaction and provide a disincentive for users to allow their nodes from joining the mesh network. The system-defined parameters 412 may further include an activity type parameter 424 that defines which types of signals are allowed (e.g. cellular phone signals, text message signals and email signals) or activity types of signals that are prohibited (e.g. gaming signals).

In one embodiment, in the event of a conflict between the user-defined parameters 410 and the system-defined parameters 412, there may be an order of precedence established to resolve conflicting constraints. In one embodiment, in the event of a conflict between the user-defined parameters 410 and the system-defined parameters 412, the user-defined parameters 410 will over-ride the conflicting system-defined parameter. Conversely, in another embodiment, the in the event of a conflict between the user-defined parameters 410 and the system-defined parameters 412, the system-defined parameters 412 will over-ride the conflicting system-defined parameter. In still other embodiments, order of precedence may depend on which parameters are conflicting.

Once the method 400 determines the transmission route, the remote node may transmit signals along the route to the access point. It should be appreciated that in a mesh network having one or more nodes that are mobile devices (e.g. cell phones, tablet computers, laptop computers), the nodes may enter, exit or move within the mesh network. Thus the arrangement and configuration of the mesh network may dynamically change. In such an embodiment, the method 400 may loop back and identify on a periodic, aperiodic or continuous basis the identity and location of the nodes within the mesh network. As a result, the route used to transmit signals from a remote node to an access point may change with different intermediate nodes relaying signals over the course of a period of time.

It should be appreciated that while the illustrated embodiments had a particular number of remote nodes and intermediate nodes, this was for clarity purposes and the claims should not be so limited. In embodiments, there may be any number of remote or intermediate nodes within the mesh network. Further, the illustrated embodiment discusses only a single intermediate node between the remote node and the access point (e.g. a one "hop" route). This is for exemplary purposes and the claims should not be so limited. In embodiments, the mesh network may support any number of intermediate nodes (e.g. a "multi-hop" route) between the remote node and the access point. Further, it should be appreciated that the mesh network may include multiple access points and the determination of the routes may include determining which access point the intermediate nodes should transmit the signal.

Technical effects and benefits of some embodiments include a method and system for routing signals in a mesh communications network that allows users to control how their device will be used by the network and also avoids unduly burdening intermediary nodes by distributing the transmission routes between multiple nodes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for routing a signal in a mesh network, the method comprising:
   identifying a first intermediate node and a second intermediate node disposed between a first node and an access point, the first node being coupled for communication to both the first intermediate node and the second intermediate node;
   determining a first set of parameters associated with the first intermediate node, wherein at least one parameter of the first set of parameters is a recharge potential parameter of the first intermediate node;
   determining a second set of parameters associated with the second intermediate node, wherein at least one parameter of the second set of parameters is a recharge potential parameter of the second intermediate node;
   determining a route for transmitting a signal from the first node to the access point using at least one of the first intermediate node and the second intermediate node, the route being chosen based at least in part on the first set of parameters and the second set of parameters; and
   transmitting the signal on the route from the first node to the access point.

2. The method of claim 1 wherein the first set of parameters includes at least a first user defined parameter and the recharge potential parameter of the first intermediate node, and wherein the second set of parameters includes at least a second user-defined parameter and the recharge potential parameter of the second intermediate node.

3. The method of claim 2 further comprising defining a plurality of system parameters, wherein identifying the route is further based in part on the plurality of system parameters.

4. The method of claim 3 wherein the plurality of system parameters includes at least a minimum system reliability parameter.

5. The method of claim 1 wherein the first set of parameters further includes a first rate of discharge of a first battery on the first intermediate node, and the second set of parameters further includes a second rate of discharge of a second battery on the second intermediate node.

6. The method of claim 1 further comprising:
determining the route with a computing device coupled for communication to the access point; and
wherein the determination of the route is based on the first set of parameters and the second set of parameters, wherein at least one of the first set of parameters and the second set of parameters includes at least one of the parameters selected from a group consisting of: a rate of depletion of battery power, a signal strength threshold, a device type, an activity type, a priority level of the node use, a limit for a number of transmitting nodes to be routed through a single intermediary node, a network speed threshold, and a bandwidth threshold.

7. The method of claim 6 wherein at least one of the first set of parameters and the second set of parameters include a plurality of parameters, each of the plurality of parameters being weighted.

8. The method of claim 6 wherein at least one of the first set of parameters and the second set of parameters includes at least one user-defined parameter selected from a group consisting of: a minimum battery charge at a predetermined time period, allowable relay transmission types, time periods when available to perform as an intermediate node, and allowable user connections.

9. A system for routing a signal in a mesh network, the system comprising:
a memory having computer readable instructions; and
one or more processors for executing the computer readable instructions, the computer readable instructions comprising:
identifying a first intermediate node and a second intermediate node disposed between a first node and an access point, the first node being coupled for communication to both the first intermediate node and the second intermediate node;
determining a first set of parameters associated with the first intermediate node, wherein at least one parameter of the first set of parameters is a recharge potential parameter of the first intermediate node;
determining a second set of parameters associated with the second intermediate node wherein at least one parameter of the second set of parameters is a recharge potential parameter of the second intermediate node;
identifying a route for transmitting a signal from the first node to the access point using at least one of the first intermediate node and the second intermediate node, the route being chosen based at least in part on the first set of parameters and the second set of parameters; and
transmitting the signal on the route from the first node to the access point.

10. The system of claim 9 wherein the first set of parameters includes at least a first user-defined parameter and the recharge potential parameter of the first intermediate node, and wherein the second set of parameters includes at least a second user-defined parameter and the recharge potential parameter of the second intermediate node.

11. The system of claim 9 wherein the first set of parameters further includes a first rate of discharge of a first battery on the first intermediate node, and the second set of parameters further includes a second rate of discharge of a second battery on the second intermediate node.

12. The system of claim 11 wherein the computer readable instructions further comprise defining a plurality of system parameters, wherein identifying the route is further based in part on the plurality of system parameters.

13. The system of claim 12 wherein the plurality of system parameters includes at least a minimum system reliability parameter.

14. The system of claim 9 wherein the computer readable instructions further comprise determining the route with a computing device coupled for communication to the access point, wherein the determination of the route is based on the first set of parameters and the second set of parameters, wherein at least one of the first set of parameters and the second set of parameters includes at least one of the parameters selected from a group consisting of: a rate of depletion of battery power, a signal strength threshold, a device type, an activity type, a priority level of the node use, a limit for a number of transmitting nodes to be routed through a single intermediary node, a network speed threshold, and a bandwidth threshold.

15. The system of claim 14 wherein at least one of the first set of parameters and the second set of parameters include a plurality of parameters, each of the plurality of parameters being weighted.

16. The system of claim 14 wherein at least one of the first set of parameters and the second set of parameters includes at least one user-defined parameter selected from a group consisting of: a minimum battery charge at a predetermined time period, allowable relay transmission types, time periods when available to perform as an intermediate node, and allowable user connections.

17. A computer program product for routing a signal in a mesh network, the computer program product comprising a computer readable storage medium having program instructions embodied therewith, the program instructions executable by a processor to cause the processor to perform:
identifying a first intermediate node and a second intermediate node disposed between a first node and an access point, the first node being coupled for communication to both the first intermediate node and the second intermediate node;
determining a first set of parameters associated with the first intermediate node, wherein at least one parameter of the first set of parameters is a recharge potential parameter of the first intermediate node;
determining a second set of parameters associated with the second intermediate node, wherein at least one parameter of the second set of parameters is a recharge potential parameter of the second intermediate node;
identifying a route for transmitting a signal from the first node to the access point using at least one of the first intermediate node and the second intermediate node, the route being chosen based at least in part on the first set of parameters and the second set of parameters; and
transmitting the signal on the route from the first node to the access point.

18. The computer program product of claim 17 wherein the first set of parameters includes at least a first user-defined parameter and the recharge potential parameter of the first intermediate node, and the second set of parameters includes at least a second user-defined parameter and the recharge potential parameter of the second intermediate node.

19. The computer program product of claim 17 wherein the first set of parameters further includes a first rate of discharge of a first battery on the first intermediate node, and the second set of parameters further includes a second rate of discharge of a second battery on the second intermediate node.

20. The computer program product of claim 17 further comprising:
   determining the route with a computing device coupled for communication to the access point; and
   wherein the determination of the route is based on the first set of parameters and the second set of parameters, wherein at least one of the first set of parameters and the second set of parameters includes at least one of the parameters selected from a group consisting of: a rate of depletion of battery power, a signal strength threshold, a device type, an activity type, a priority level of the node use, a limit for a number of transmitting nodes to be routed through a single intermediary node, a network speed threshold, and a bandwidth threshold.

* * * * *